United States Patent [19]

Burton et al.

[11] Patent Number: 4,867,907

[45] Date of Patent: Sep. 19, 1989

[54] AQUEOUS ARYL FLUOROPHOSPHITE SUSPENSION

[75] Inventors: Lester P. J. Burton, Baton Rouge, La.; Morris Blumberg, Tarrytown, N.Y.

[73] Assignee: Ethyl Corporation, Richmond, Va.

[21] Appl. No.: 78,200

[22] Filed: Jul. 27, 1987

[51] Int. Cl.$^4$ ............................................. C09K 15/32
[52] U.S. Cl. ................................ 252/400.24; 558/84; 558/202; 558/156; 524/118; 524/149
[58] Field of Search .................... 252/400.24; 558/84, 558/202, 156; 524/118, 149

[56] References Cited

U.S. PATENT DOCUMENTS

| | | | |
|---|---|---|---|
| 3,014,950 | 12/1961 | Birum | 558/103 X |
| 3,655,593 | 5/1972 | Johnson et al. | 558/103 X |
| 3,702,878 | 11/1972 | Saito et al. | 524/118 X |
| 4,032,602 | 9/1975 | Mazour et al. | 558/202 X |
| 4,196,117 | 1/1978 | Spirack | 252/400.24 X |
| 4,259,492 | 3/1979 | Rasberger | 558/84 X |
| 4,351,759 | 3/1981 | Spirack | 252/400.24 X |
| 4,439,570 | 3/1984 | Messina et al. | 252/400.24 X |

Primary Examiner—John F. Terapane
Assistant Examiner—Valerie Denise Fee
Attorney, Agent, or Firm—Joseph D. Odenweller

[57] ABSTRACT

Aryl fluorophosphites have been found to be effective polymer stabilizers and are hydrolytically stable when used to form aqueous suspensions.

14 Claims, No Drawings

AQUEOUS ARYL FLUOROPHOSPHITE SUSPENSION

BACKGROUND

It is known to contact polyamide filament with aqueous emulsions or dispersions which contain adjuvants which improve the processability and other properties of the filament. These include lubricants and similar materials such as those described in U.S. Pat. No. 4,129,507. It is also desirable to includes antioxidants in such aqueous suspensions. Aryl phosphites are especially effective in protecting polyamide fibers when applied in this fashion. Likewise resin latex used, for example, in carpet backing, latex paints, adhesives and the like can be stabilized to provide a longer useful life both before and after application by the incorporation of a stabilizer. Unfortunately, many aryl phosphite stabilizers such as tri(2,4-di-tert-butylphenyl) phosphite have been found to be hydrolytically unstable and hydrolyze quite rapidly such that the aryl phosphite suspension has a rather short "shelf life."

SUMMARY OF THE INVENTION

It has now been discovered that aryl fluorophosphites are effective polymer stabilizers that can be applied as aqueous suspensions without rapid hydrolysis. The suspensions are hydrolytically stable resulting in a long shelf life.

DESCRIPTION OF THE PREFERRED EMBODIMENTS

A preferred embodiment of the invention is a hydrolytically stable aqueous suspension containing (a) about 0.01–50 weight percent of an aryl fluorophosphite, (b) a surfactant and (c) water, suitable for use in spin finishing of polyamide filament. By "suspension" is meant either a dispersion of particulate solids in a water medium or an emulsion of multi-phase liquids (e.g., oil-in-water emulsions) wherein the aryl fluorophosphite is in the organic phase.

The preferred aryl fluorophosphites have the formula

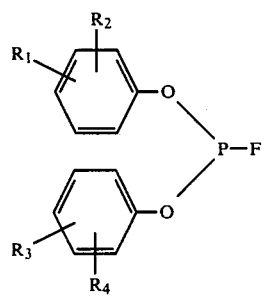

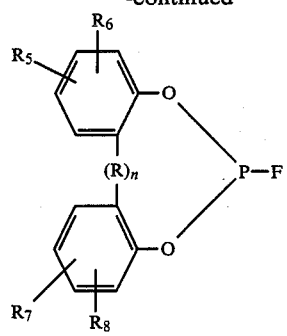

wherein R is a divalent aliphatic hydrocarbon group; $R_1$, $R_3$, $R_5$ and $R_7$ are independently selected from the group consisting of hydrogen, alkyl, cycloalkyl, aryl, aralkyl and alkaryl and $R_2$, $R_4$, $R_6$ and $R_8$ are independently selected from the group consisting of alkyl, cycloalkyl, aryl, aralkyl and alkaryl and n is zero or 1.

Aryl fluorophosphite having the above structures are described in co-pending application Ser. No. 020,023 filed Feb. 27, 1987 by Lester P. J. Burton incorporated herein by reference.

Representative examples of $R_1$, $R_2$, $R_3$, $R_4$, $R_5$, $R_6$, $R_7$ and $R_8$ are methyl, ethyl, propyl, isopropyl, butyl, sec-butyl, isobutyl, tert-butyl, hexyl, 2-ethylhexyl, decyl, dodecyl, cyclopentyl, cyclohexyl, cycloctyl, cyclododecyl, phenyl, p-methylphenyl, o-methylphenyl, p-tert-butylphenyl, m-methylphenyl, o-sec-pentylphenyl, p-isopropylphenyl, 2,4-dimethylphenyl, 2-methyl-4-tert-butylphenyl, benzyl, α-methylbenzyl; α, α-dimethylbenzyl, 4-methyl- α-methylbenzyl and the like.

In a still more preferred embodiment $R_1$, $R_2$, $R_3$, $R_4$, $R_5$, $R_6$, $R_7$ and $R_8$ are alkyl groups such as methyl, isopropyl, tert-butyl, sec-butyl, tert-octyl, 2-ethylhexyl, 1-methylundecyl, 1-methyltridecyl, 1-ethyloctadecyl and the like.

Representative examples of compounds of formula I are bis(2-tert-butylphenyl) fluorophosphite, bis(4-tert-butylphenyl) fluorophosphite, bis(2-cyclohexylphenyl) fluorophosphite, bis[4-(α-methylbenzyl)phenyl] fluorophosphite, bis[2-(α, α-dimethylbenzyl)-4-methylphenyl]fluorophosphite, bis(2,4-di-tert-butylphenyl) fluorophosphite, bis(2,4-diisopropylphenyl) fluorophosphite, 2,4-di-tert-butylphenyl 2-tert-butylphenyl fluorophosphite, 2,4-dimethylphenyl 4-tert-butylphenyl fluorophosphite, bis(2,6-di-tert-butylphenyl) fluorophosphite, (2,6-diisopropylphenyl) fluorophosphite, bis(2-methyl-6-tert-butylphenyl) fluorophosphite, bis(2,6-dicyclohexylphenyl) fluoro phosphite and the like.

As described in co-pending application Ser. No. 020,023, the compounds of formula I can be made by reacting 2 moles of the appropriate substituted phenol with 1 mole of phosphorus trichloride to form a diaryl chlorophosphite and then conducting a halogen exchange with a salt such as potassium The R group in formula II is a divalent aliphatic hydrocarbon bridging group and is present when n is 1 and absent when n is 0. Representative examples of compounds having formula II when n is 1 are:
2,2'-methylenebis(4,6-di-tert-butylphenyl) fluorophosphite
2,2'-ethylidenebis(4,6-dimethylphenyl) fluorophosphite 2,2'-isopropylidenebis(4-tert-octylphenyl) fluorophosphite
2,2'-propylidenebis[4-α-methylbenzyl)phenyl] fluorophosphite
2,2'-(1-methylbutylidenebis)(4,6-diisopropylphenyl) fluorophosphite
2,2'-benzylidenebis(4-methyl-6-tert-butylphenyl) fluorophosphite
and the like.

The most preferred compound of formula II when n is 1 is 2,2,-ethylidenebis(4,6-di-tert-butylphenyl) fluorophosphite.

In formula II when n is zero the two phenyl groups are directly bonded at their ortho positions. Representative examples of these fluorophosphites are:
2,2'-bis(4-methyl-6-tert-butylphenyl) fluorophosphite
2,2'-bis(6-tert-butylphenyl) fluorophosphite
2,2'-bis(6-methylphenyl) fluorophosphite
2,2'-bis[4-α-methylbenzyl)phenyl]fluorophosphite
2,2'-bis(4,6-diisopropylphenyl) fluorophosphite
2,2'-bis(6-cyclohexylphenyl) fluorophosphite
and the like.

The preferred aryl fluorophosphite of formula II when n is 0 is 2,2,-bis(4,6-di-tert-butylphenyl) fluorophosphite.

The compounds of formula II are made in the same manner as those of formula I except that 1 mole of the biphenolic compound is first reacted with 1 mole of phosphorus trichloride to form the aryl chlorophosphite since the biphenolic compound has two hydroxyl groups. The chloro group is then exchanged with a fluoro group by conventional chemistry.

The dispersions can be made by grinding the aryl fluorophosphite to a very fine particle size, preferably under 20 microns and more preferably under 10 microns on average. This can be done in conventional size reduction equipment such as a ball mill, air mill, hammer mill and the like. In making the dispersions used in the following tests, a Polytron instrument sold by Brinkman Instruments was used.

Any water soluble surfactant can be used such as sodium laurylsulfate, sodium dodecylbenzene sulfonate, sodium alkylglycerolether sulfate, sodium stearate, sodium oleate and the like. The amount of surfactant should be a dispersant amount, that is, an amount that maintains the dispersed particulate in suspension for an extended time period. A useful range is about 0.01 parts per hundred (pph) parts water.

The grinding can be carried out wet or dry. The solids are then dispersed in water containing an effective amount of the surfactant. Solid loading of the dispersions can range from 0.01 up to 75 weight percent or more. A preferred amount is about 0.1-60 weight percent aryl fluorophosphite Aqueous dispersions were made containing several commercial phosphite stabilizers and also one containing an aryl fluorophosphite of the present invention. The phosphites used were as follows:
A.[1] 2,2,'-ethylidenebis(4,6-di-tert-butylphenyl) fluorophosphite
B.[2] tris(2,4-di-tert-butylphenyl) phosphite
C.[3] pentaerythritol bis(2,4-di-tert-butylphenyl) diphosphite
D.[4] tetrakis(2,4-di-tert-butylphenyl) 4,4,-bi-phenylene diphosphonite

[1] An aryl fluorophosphite of the present invention.
[2] Stabilizer sold by Ciba Geigy under trademark "Irgaphos 168."
[3] Stabilizer sold by Borg Warner under trademark "Ultranox 626."
[4] Stabilizer sold by Sandoz under trademark "Sandostab P-EPQ."

Aqueous dispersions of each were prepared using a Brinkman Polytron. Each dispersion sample contained 100 grams of water, 1.24 grams sodium lauryl sulfate and 24 grams of stabilizer. Each sample was placed in an Aquatherm Shaker Bath maintained at 60° C. After overnight aging, Sample C formed a second liquid phase which was mainly 2,4-di-tert-butylphenol formed by hydrolysis. The pH of the aqueous phase was 3.0 indicating extensive hydrolysis. This sample was removed and the test continued with Samples A, B and D. The acidity (pH) was measured periodically with the following results.

| Time (days) | Sample | | |
| --- | --- | --- | --- |
| | A | B | D |
| 1 | 7.5 | 3.0 | 2.0 |
| 2 | 7.6 | 2.6 | 1.1 |
| 4 | 7.2 | | |
| 7 | 7.2 | | |
| 11 | 7.07 | | |
| 14 | 7.02 | | |
| 16 | 7.03 | | |
| 21 | 7.08 | | |
| 23 | 6.96 | | |
| 25 | 6.93 | | |
| 35 | 6.64 | | |

The results showed that the commercial phosphite or phosphonite stabilizers hydrolyzed extensively after only one day in an aqueous system. Surprisingly the aqueous fluorophosphite dispersion was highly stable against hydrolysis. Its pH did not turn acid until day 23 and even then was hydrolyzing very slowly. This is most unexpected in view of the phosphorus bound fluorine which one would expect to hydrolyze rapidly. For example, Lange's Handbook of Chemistry, 8th edition at pages 268-9 states that $PF_3$ forms P+HF on contact with cold water. The "Handbook of Chemistry and Physics" 57th ed. CRC Press at page B-139 states that both $PF_3$ and $PF_5$ decompose on contact with water. Not only did this not occur but the entire molecule showed excellent resistance to hydrolysis.

The aqueous dispersions and emulsions described herein have many uses. They can be used in water based pressure contact adhesives. They are useful in stabilizing polymeric emulsions such as ABS emulsions and rubber latex. They can be used in latex paints to impart oxidative stability. They are also used in ink formulations and in electroplating coatings. They can be used as a spray for polymers containing active catalyst in order to provide oxidative stability during aqueous quenching of the catalyst such as those used in the manufacture of olefin polymers such as polyethylene, polypropylene, cis-polybutadiene ethylene-propylene copolymers, linear low density polyethylene and the like. They are useful in disproportionation reactions involving rosin esters.

The present compositions are especially useful in formulations used in textile spin finishing such as in spin finishing polyamide filaments. One such formulation is described in U.S. Pat. No. 4,129,503. This spin finishing formulation is an aqueous oil-in-water emulsion containing oxidized polyethylene wax, white mineral oil, polyoxyethylene oleyl phosphate and sulfonated succinic acid ester of decyl alcohol. Such formulations are improved by the inclusion of an aqueous aryl fluorophosphite emulsion or dispersion of the present invention. In making aqueous emulsions the aryl fluorophosphite is dissolved in the organic components in the formulation and the mixture is emulsified to form an oil-in-water emulsion in which the aryl fluorophosphite is in the oil phase. Alternatively the aryl fluorophosphite can be dissolved in a suitable solvent and the solvent then emulsified in water containing a surfactant to form an aqueous emulsion containing an aryl fluorophosphite of the present invention.

The fluorophosphites can be dispersed in resin latex used in such applications as carpet backing. For example a latex made using carboxylic styrene-butadiene resin containing a surfactant and about 0.01–1 weight percent suspended finely divided bis(2,4-di-tert-butylphenyl) fluorophosphite based on the weight of resin can be used to coat carpet backing. Other stabilizers can be included in the latex such as 4,4,λ-methylenebis(2,6-di-tert-butylphenol, 1,3,5-trimethyl-2,4,6-tri(3,5-di-tert-butyl-4-hydroxybenzyl) benzene and the like.

Emulsion polymerized polybutadiene latex can be stabilized by adding an aqueous suspension of the present fluorophosphites. Alternatively the polybutadiene latex can be quenched into a fluorophosphite aqueous suspension of the present invention.

In a similar manner, solution polymerized resin such as solution polymerized cis-polybutadiene can be coagulated in an aqueous mixture containing suspended fluorophosphite stabilizer of this invention.

If aqueous emulsions of the fluorophosphites are desired rather than dispersions, the fluorophosphite is dissolved in a solvent such as toluene, xylene and the like and the solution is emulsified in, water containing a surfactant. The following illustrates the preparation of an emulsion.

Example

Prepare an aqueous solution containing 102 parts by weight water, 0.4 parts KOH and 2.0 parts oleic acid.

Prepare a solution of 25 parts bis(2,4-di-tert-butyl phenyl) fluorophosphite in 75 parts war toluene.

With high speed agitation add the toluene solution to the water mixture.

The following example illustrates the preparation of a aqueous dispersion of solid fluorophosphite for blending with latex.

Example

Prepare a mixture of 100 parts by weight of particulate 2,2'-bis(4,6-di-tert-butylphenyl) fluorophosphite, 1.0 parts bentonite clay, 4.0 parts Daxad 11 (W. R. Grace Co.) and 95 parts water. Place the mixture in a ball mill and mill for 24–48 hours until most particles are less than 2 micron diameter. The resulting dispersion can be added to any of a wide variety of latices in an amount sufficient to provide the desired amount of stability.

We claim:

1. A hydrolytically stable aqueous phosphite antioxidant suspension said suspension comprising:
   (A) about 0.01–50 weight percent of an aryl fluorophosphite stabilizer having the formula:

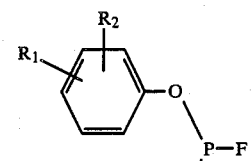

or

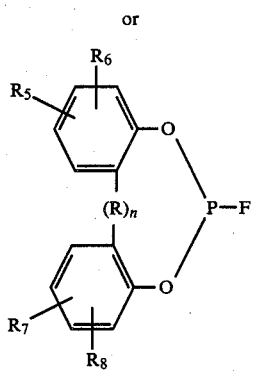

wherein R is a divalent aliphatic hydrocarbon group; $R_1$, $R_3$, $R_5$, and $R_7$ are independently selected from the group consisting of hydrogen, alkyl, cycloalkyl, aryl, aralkyl and alkaryl and $R_2$, $R_4$, $R_6$ and $R_8$ are independently selected from the group consisting of alkyl, cycloalkyl, aryl, aralkyl and alkaryl and n is zero or 1;
(B) a water soluble surfactant and
(C) water.

2. An aqueous phosphite suspension of claim 1 wherein $R_1$, $R_2$, $R_3$, $R_4$, $R_5$, $R_6$, $R_7$ and $R_8$ are alkyl 3. An aqueous phosphite suspension of claim 1 wherein said aryl fluorophosphite has Formula I.

4. An aqueous phosphite suspension of claim 3 wherein $R_1$, $R_2$, $R_3$ an $R_4$ are alkyls.

5. An aqueous phosphite suspension of claim 4 wherein said aryl fluorophosphite is bis(2,4-di-tert-butylphenyl) fluorophosphite.

6. An aqueous phosphite suspension of claim 4 wherein said aryl fluorophosphite is bis(2,6-di-tert-butylphenyl) fluorophosphite.

7. An aqueous phosphite suspension of claim 1 wherein said aryl fluorophosphite has Formula II wherein n is 0.

8. An aqueous phosphite suspension of claim 7 wherein $R_5$, $R_6$, $R_7$ and $R_8$ are alkyls.

9. An aqueous phosphite suspension of claim 8 wherein said aryl fluorophosphite is 2,2,'-bis(4,6-di-tert-butylphenyl) 2fluorophosphite.

10. An aqueous phosphite suspension of claim 1 wherein said aryl fluorophosphite has Formula II wherein n is 1.

11. An aqueous phosphite suspension of claim 10 wherein R is a divalent aliphatic hydrocarbon radical containing 1–12 carbon atoms.

12. An aqueous phosphite suspension of claim 11 wherein $R_5$, $R_6$, $R_7$ and $R_8$ are alkyls.

13. An aqueous phosphite suspension of 12 wherein said aryl fluorophosphite is 2,2,'-ethylidenebis(4,6-di-tert-butylphenyl) fluorophosphite.

14. An aqueous phosphite suspension of claim 12 wherein said aryl fluorophosphite is 2,2'-methylenebis(4,6-di-tertbutylphenyl) fluorophosphite.

* * * * *

UNITED STATES PATENT AND TRADEMARK OFFICE
CERTIFICATE OF CORRECTION

PATENT NO. : 4,867,907

DATED : SEPTEMBER 19, 1989

INVENTOR(S) : LESTER P. J. BURTON ET AL.

It is certified that error appears in the above-identified patent and that said Letters Patent is hereby corrected as shown below:

Column 6, line 54 reads "butylphenyl)2fluorophosphite" and should read -- butylphenyl)fluorophosphite -- .

Column 6, line 62 reads "of 12" and should read -- of Claim 12 -- .

Signed and Sealed this

Eighteenth Day of September, 1990

Attest:

HARRY F. MANBECK, JR.

Attesting Officer

Commissioner of Patents and Trademarks